US006999479B1

(12) United States Patent
Jha

(10) Patent No.: US 6,999,479 B1
(45) Date of Patent: Feb. 14, 2006

(54) HYBRID DATA TRANSPORT SCHEME OVER OPTICAL NETWORKS

(75) Inventor: Pankaj K. Jha, Fremont, CA (US)

(73) Assignee: Cypress Semiconductor Corp., San Jose, CA (US)

( * ) Notice: Subject to any disclaimer, the term of this patent is extended or adjusted under 35 U.S.C. 154(b) by 811 days.

(21) Appl. No.: 09/616,956

(22) Filed: Jul. 14, 2000

Related U.S. Application Data

(60) Provisional application No. 60/184,264, filed on Feb. 23, 2000.

(51) Int. Cl.
*H04J 3/04* (2006.01)

(52) U.S. Cl. ........................................ 370/535; 370/395

(58) Field of Classification Search ................ 370/258, 370/353, 389, 395.1, 395.52, 400, 406, 424, 370/460, 471–474, 466–467, 477, 535, 470, 370/395.5

See application file for complete search history.

(56) References Cited

U.S. PATENT DOCUMENTS

| | | | | |
|---|---|---|---|---|
| 4,236,245 A | | 11/1980 | Freeny et al. | 370/94 |
| 4,237,553 A | * | 12/1980 | Larsen | 370/389 |
| 4,542,502 A | | 9/1985 | Levinson et al. | 370/88 |
| 4,700,341 A | | 10/1987 | Huang | 370/80 |
| 4,761,781 A | | 8/1988 | Calvignac et al. | 370/94 |
| 4,939,726 A | | 7/1990 | Flammer et al. | 370/94.1 |
| 4,974,189 A | | 11/1990 | Russon et al. | 364/900 |
| 4,998,242 A | | 3/1991 | Upp | 370/60 |
| 5,113,392 A | | 5/1992 | Takiyasu et al. | 370/85.15 |
| 5,144,619 A | | 9/1992 | Munter | 370/60.1 |
| 5,208,811 A | | 5/1993 | Kashio et al. | 370/401 |
| 5,251,217 A | | 10/1993 | Travers et al. | 370/112 |
| 5,282,195 A | | 1/1994 | Hood et al. | 370/58.1 |
| 5,365,272 A | | 11/1994 | Siracusa | 348/426 |
| 5,450,397 A | | 9/1995 | Wahlman | 370/60 |
| 5,526,349 A | | 6/1996 | Diaz et al. | 370/58.1 |
| 5,530,806 A | | 6/1996 | Condon et al. | 714/49 |
| 5,537,428 A | | 7/1996 | Larsson et al. | 371/37.1 |
| 5,539,750 A | | 7/1996 | Kivi-Mannila et al. | 370/506 |
| 5,555,243 A | | 9/1996 | Kakuma et al. | 370/58.2 |
| 5,583,859 A | | 12/1996 | Feldmeier | 370/471 |
| 5,610,744 A | | 3/1997 | Ho et al. | 359/118 |
| 5,666,351 A | | 9/1997 | Oksanen et al. | 370/474 |
| 5,784,380 A | | 7/1998 | Kuwahara | 370/509 |
| 5,796,720 A | | 8/1998 | Yoshida et al. | 370/245 |
| 5,796,944 A | | 8/1998 | Hill et al. | 395/200.8 |
| 5,802,043 A | | 9/1998 | Skillen et al. | 370/258 |
| 5,831,970 A | | 11/1998 | Arao | 370/227 |
| 5,912,895 A | | 6/1999 | Terry et al. | 370/445 |
| 5,915,105 A | | 6/1999 | Farmwald et al. | 395/309 |
| 5,915,252 A | | 6/1999 | Misheski et al. | 707/103 |
| 5,920,705 A | | 7/1999 | Lyon et al. | 395/200.7 |

(Continued)

OTHER PUBLICATIONS

Ishii et al., Virtual sub-container multiplexing method for optical subscriber system; Global Telecommunications Conference, 1990, and Exhibition, 'Communications: Connecting the Future', GLOBECOM '90, IEEE, Dec. 2-5, 1990, pp. 115-119, vol. 1.

(Continued)

*Primary Examiner*—Man U. Phan
*Assistant Examiner*—Toan D. Nguyen
(74) *Attorney, Agent, or Firm*—Christopher P. Maiorana, PC

(57) ABSTRACT

An apparatus comprising one or more nodes. The apparatus may be configured to transport one or more packets within a frame. The one or more nodes may be configured to add and/or drop at least one of the one or more packet from the frame.

18 Claims, 9 Drawing Sheets

U.S. PATENT DOCUMENTS

| | | | | |
|---|---|---|---|---|
| 5,946,315 | A | 8/1999 | Ramfelt et al. | 370/403 |
| 5,949,755 | A * | 9/1999 | Uphadya et al. | 370/224 |
| 5,953,263 | A | 9/1999 | Farmwald et al. | 365/194 |
| 5,954,804 | A | 9/1999 | Farmwald et al. | 710/36 |
| 5,958,069 | A | 9/1999 | Kawasaki et al. | 714/11 |
| 5,978,378 | A | 11/1999 | Van Seters et al. | 370/401 |
| 5,995,443 | A | 11/1999 | Farmwald et al. | 365/233 |
| 6,011,802 | A | 1/2000 | Norman | 370/466 |
| 6,028,861 | A | 2/2000 | Soirinsuo et al. | 370/395 |
| 6,038,230 | A | 3/2000 | Ofek | 370/389 |
| 6,047,002 | A | 4/2000 | Hartmann et al. | 370/466 |
| 6,075,788 | A * | 6/2000 | Vogel | 370/395.51 |
| 6,097,720 | A | 8/2000 | Araujo et al. | 370/355 |
| 6,122,281 | A | 9/2000 | Donovan et al. | 370/401 |
| 6,160,819 | A | 12/2000 | Partridge et al. | 370/474 |
| 6,169,749 | B1 * | 1/2001 | Dove et al. | 370/474 |
| 6,212,185 | B1 | 4/2001 | Steeves et al. | 370/392 |
| 6,233,074 | B1 * | 5/2001 | Lahat et al. | 398/79 |
| 6,236,660 | B1 | 5/2001 | Heuer | 370/409 |
| 6,301,254 | B1 | 10/2001 | Chan et al. | 370/397 |
| 6,317,433 | B1 | 11/2001 | Galand et al. | 370/395.2 |
| 6,320,863 | B1 | 11/2001 | Ramfelt | 370/404 |
| 6,331,978 | B1 | 12/2001 | Ravikanth et al. | 370/392 |
| 6,356,368 | B1 | 3/2002 | Arao | 359/124 |
| 6,356,544 | B1 * | 3/2002 | O'Connor | 370/353 |
| 6,377,645 | B1 * | 4/2002 | Chen et al. | 375/372 |
| 6,400,720 | B1 | 6/2002 | Ovadia et al. | 370/395.64 |
| 6,442,694 | B1 | 8/2002 | Bergman et al. | 713/201 |
| 6,469,983 | B1 | 10/2002 | Narayana et al. | 370/231 |
| 6,473,421 | B1 | 10/2002 | Tappan | 370/351 |
| 6,501,756 | B1 | 12/2002 | Katsube et al. | 370/392 |
| 6,501,758 | B1 * | 12/2002 | Chen et al. | 370/395.1 |
| 6,532,088 | B1 | 3/2003 | Dantu et al. | 359/119 |
| 6,542,511 | B1 * | 4/2003 | Livermore et al. | 370/406 |
| 6,546,021 | B1 | 4/2003 | Slane | 370/465 |
| 6,580,537 | B1 | 6/2003 | Chang et al. | 359/124 |
| 6,584,118 | B1 | 6/2003 | Russell et al. | 370/466 |
| 6,636,529 | B1 | 10/2003 | Goodman et al. | 370/469 |
| 6,658,002 | B1 | 12/2003 | Ross et al. | 370/392 |
| 6,765,928 | B1 * | 7/2004 | Sethuram et al. | 370/476 |

OTHER PUBLICATIONS

Faten Ben Slimane, et al., Signaling in IP cell-switching; Computers and Communications, 1999 Proceedings, IEEE International Symposium, Jul. 6-8, 1999, pps. 116-120.

W. Simpson, "Request for Comments (RFC) 1619", Internet Engineering Task Force, Network Working Group, May 1994, pps. i, ii, 1-3.

Doshi et al., Simple data link (SDL) protocol: an efficient and low complexity data link protocol for high-speed packet networks, Global Telecommunications conference, 1999, GLOBECOM '99, vol. 2, Dec. 5-9, 1999, pp. 1295-1301.

Wideband Packet over SONET (WPOS), Cisco Systems, Inc., 1999, pp. 1-8.

Pankaj K. Jha, Hybrid Data Transport Scheme Over Optical Networks, U.S. Appl. No. 09/523,576, filed Mar. 10, 2000.

Pankaj K. Jha, Hybrid Data Transport Scheme Over Optical Networks, U.S. Appl. No. 09/535,717, filed Mar. 27, 2000.

Pankaj K. Jha, Hybrid Data Transport Scheme Over Optical Networks, U.S. Appl. No. 09/523,476, filed Mar. 10, 2000.

Pankaj K. Jha, Hybrid Data Transport Scheme Over Optical Networks, U.S. Appl. No. 09/535,889, filed Mar. 27, 2000.

PPP over Simple Data Link (SDL) using SONET/SDH with ATM-like framing, By J. Carlson et al., May 2000.

A Simple Data Link Protocol for High-Speed Packet Networks, By Bharat T. Doshi et al., Bell Labs Technical Journal Jan.-Mar. 1999, pp. 85-104.

Protocols and Architectures for IP Optical Networking, By Jon Anderson et al., Bell Labs Technical Journal Jan.-Mar. 1999, pp. 105-124.

Internet Engineering Task Force Internet Draft, By Daniel O. Awduche et al., Nov. 1999, pp. 1-20.

PPP Extensions Working Group Internet Draft, By N. Jones et al., Jun. 2000, pp. 1-10.

Internet Engineering Task Force Internet Draft, By Dimitry Haskin et al., May 2000, pp. 1-9.

Network Working Group, By D. Grossman et al., Sep. 1999, pp. 1-23.

Internet Draft, By D. Tsiang et al., May 1, 2000, pp. 1-52.

Network Working Group, By A. Malis et al., Jun. 1999.

Cost-Effective Network Evolution, By Tsong-Ho Wu, IEEE Communications Magazine, Sep. 1993, pp. 64-73.

* cited by examiner

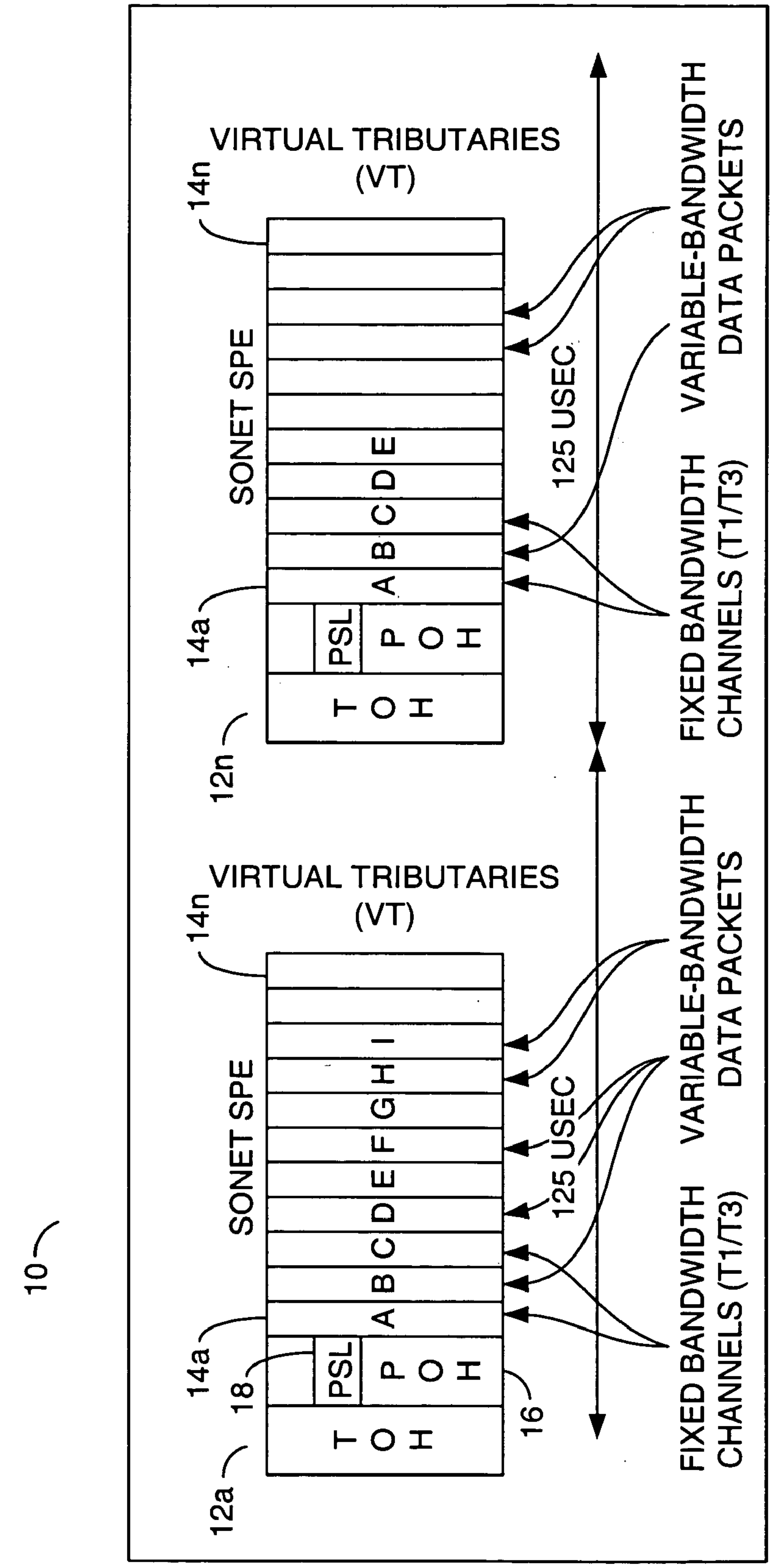
(CONVENTIONAL)
FIG. 1

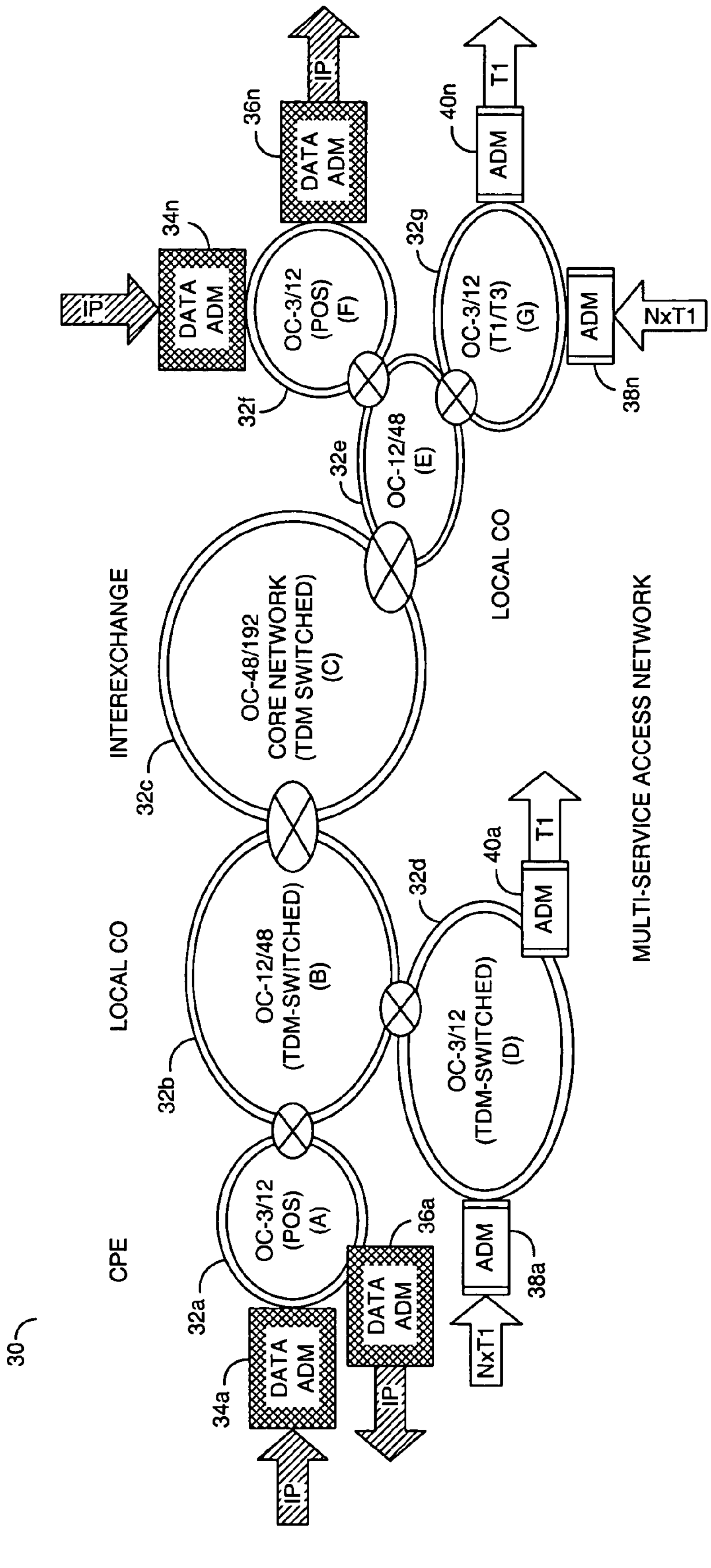
(CONVENTIONAL)
FIG. 2

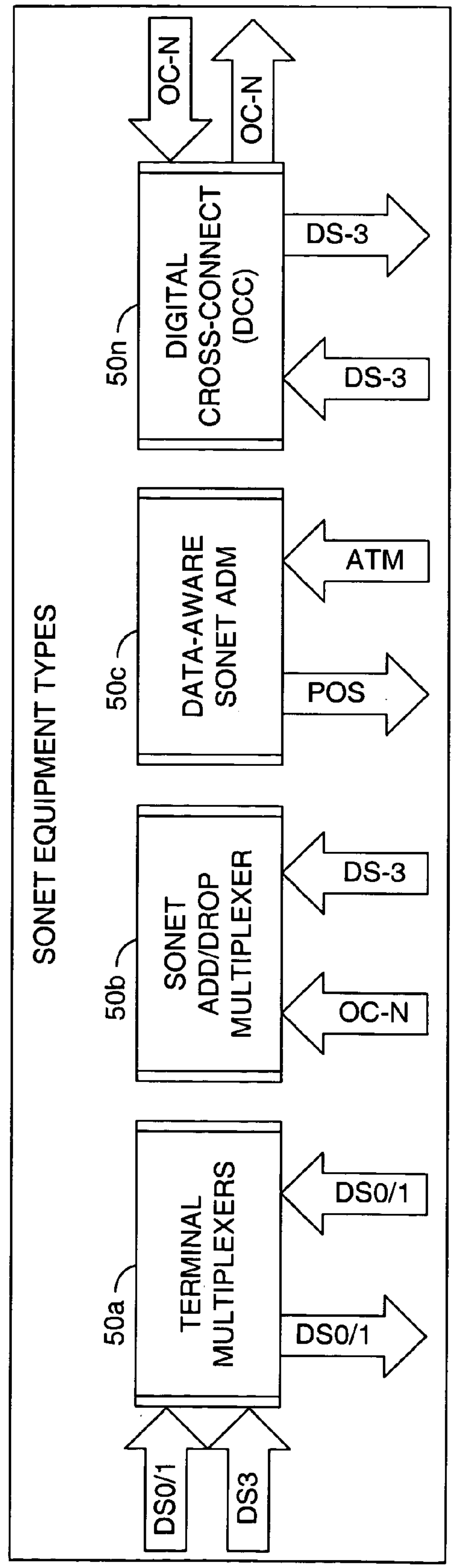
(CONVENTIONAL)
FIG. 3

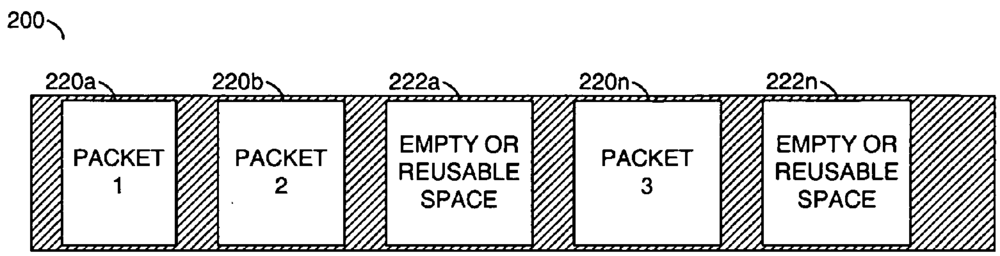

FIG. 7

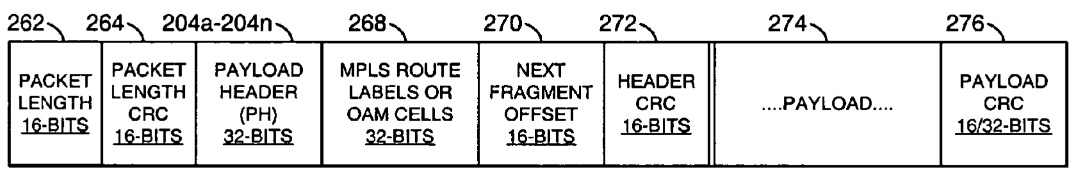

| 292 UNUSED D31:D20 | 290 PADDING D18:D19 | 288 FRAGMENT ID D17:D16 | | 286 HEADER LENGTH D15:D8 | 284 PACKET REUSE D7 | | 282 HEADER DATA D6:D4 | | 280 PACKET IDENTIFIER D3:D0 | |
|---|---|---|---|---|---|---|---|---|---|---|
| RESERVED FOR FUTURE USE | 00 : NO PAD<br>01 : 1-BYTE PAD<br>10 : 2-BYTE PAD<br>11 : 3-BYTE PAD | 00<br>01<br>10<br>11 | NO FRAG.<br>INITIAL PKT<br>CONT. PKT<br>END PKT | LENGTH OF HEADER BYTES | 0<br>1 | NO<br>YES | 000<br>001<br>010<br>011-111 | NONE<br>MPLS<br>OAM<br>(FUTURE USE) | 0000<br>0001<br>0010<br>0011<br>0100<br>0101<br>0111 - 1111 | NULL PACKET<br>ATM CELLS<br>PPP<br>IP<br>ETHERNET<br>PDH<br>(FUTURE USE) |

FIG. 9

HYBRID DATA TRANSPORT SCHEME OVER OPTICAL NETWORKS

CROSS REFERENCE TO RELATED APPLICATIONS

This application claims the benefit of U.S. Provisional Application No. 60/184,264, filed Feb. 23, 2000, which is hereby incorporated by reference in its entirety.

The present application may relate to U.S. Pat. No. 6,778,561, filed Mar. 10, 2000, U.S. Pat. No. 6,771,663, filed Mar. 10, 2000, U.S. Ser. No. 09/535,717, filed Mar. 27, 2000, U.S. Pat. No. 6,847,644, filed Mar. 27, 2000 and U.S. Ser. No. 09/535,890, filed Mar. 27, 2000, which are hereby incorporated by reference in their entirety.

FIELD OF THE INVENTION

The present invention relates to a method and/or architecture for data transport generally and, more particularly, to a method and/or architecture for hybrid data transport over optical networks.

BACKGROUND OF THE INVENTION

Conventional SONET/SDH networks are designed to efficiently carry transporting plesiochronous digital hierarchy (PDH) channels (T1/T3 channels). In order to support PDH data, the SONET/SDH frames typically have a payload that is divided into fixed timeslots called virtual tributaries (VT). In keeping with timing of the smallest of telephony components DS0 (64 Kbps), the SONET/SDH frames are of fixed length repeated at an interval of 125 μS.

At the rate of 125 μS, each byte of the SONET/SDH frame represents a basic telephony channel of DS0. The SONET/SDH frames reserve bytes to form higher-order the plesiochronous digital hierarchy (PDH) channels. For example, a T1 channel comprises 28 DS0 channels. However, growth of Internet traffic and VoIP applications requires more data traffic such as internet protocol (IP) in addition to standard PDH channels. The IP traffic is being carried on the SONET/SDH network in addition to conventional T1/T3 channels.

However, the SONET/SDH frame payload areas can only transport one type of data. A path signal label (PSL) value in path overhead (POH) bytes of the SONET/SDH frame typically identifies the type of data contained in the payload area. Transporting different data types on a single optical fiber requires complex mapping mechanisms.

Referring to FIG. 1, a conventional approach for transmitting data packets on fixed bandwidth virtual tributaries (VTs) 10 is shown. The conventional approach 10 comprises a number of SONET/SDH frames 12*a*–12*n*. Each of the SONET/SDH frames comprises a number of VTs 14*a*–14*n*. The virtual tributaries 14*a*–14*n* comprise a SONET/SDH synchronous payload envelope (SPE). Each of the SPEs can dedicate a portion of bandwidth (a number of the VTs 14*a*–14*n*) to store a particular data type. The unused bandwidth (the remaining VTs 14*a*–14*n*) can be used to transport asynchronous transfer mode (ATM) or internet protocol (IP) data traffic. However, due to the bursty nature of the ATM and IP data traffic, allocating a fixed bandwidth (a number of virtual tributaries 14*a*–14*n*) for the data traffic results in highly inefficient usage of available SONET/SDH bandwidth. For purely data-oriented high bandwidth applications, the entire SONET/SDH payload (the VTs 14*a*–14*n*) is commonly used for transporting data bytes (ATM or IP packets).

Each frame 12*a*–12*n* comprises a path over-head (POH) 16. The path over-head 16 comprises an unique path signal label (PSL) value 18 that identifies the type of data being carried inside the SPE area 14*a*–14*n*.

Referring to FIG. 2, a conventional long-haul multi-service access network 30 is shown. The network 30 comprises a number of rings 32*a*–32*n*, a first number of add multiplexers 34*a*–34*n*, a first number of drop multiplexers 36*a*–36*n*, a second number of add multiplexers 38*a*–38*n* and a second number of drop multiplexers 40*a*–40*n*. The multiplexers 34, 36, 38 and 40 must generally be capable of processing different data types (as shown in FIG. 3). The optical rings 32*a*–32*n* are optical carrier rings. The network 30 implements the optical rings 32*a*–32*n* transport IP and T1 data. The conventional network 30 implements a separate ring 32*a*–32*n* for each consumer, enterprise and metropolitan area network. The separate SONET/SDH rings 32*a*–32*n* are implemented to carry IP data using packet-over-sonet (POS), ATM, and T1 channels.

The rings 32*b* and 32*d* are local central office (CO) rings. The ring 32*c* is an interexchange ring. The central office and interexchange rings 32*a*–32*d* are time-division multiplexed (TDM). The time slots (virtual tributaries VTs) are dedicated to the smaller bandwidth rings 32*a*, 32*e*, 32*f* and 32*g* carrying POS, ATM, or T1/T3 traffic.

A point-to-point cross-connect is established through the time slots, allowing long-haul connectivity across the SONET/SDH network 30. However, provisioning long-haul transfer of data is a time consuming process and requires coordination across many links. For example, in order to transfer POS traffic from the ring A (32*a*) to the ring F (32*f*), the POS traffic has to travel through one or more time slots of the ring B (32*b*), then through similar channels at the ring C (32*c*), through the ring (32*e*) E and then to the ring F (32*f*).

Referring to FIG. 3, various types of conventional SONET/SDH add/drop devices 50*a*–50*n* are shown. The SONET/SDH add/drop devices 50*a*–50*n* are required at each node (ring 32*a*–32*n*) on the optical network 30. The add/drop devices 50*a*–50*n* are required to add and drop traffic to and from the network 30. The SONET/SDH add/drop devices 50*a*–50*n* illustrate different types of SONET/SDH add/drop multiplexers (ADM). The ADMs 50*a*–50*n* are attached to the SONET/SDH rings 32*a*–32*n* carrying data traffic (similar to the devices 34, 36, 38 and 40 of FIG. 2).

The device 50*a* is a terminal multiplexer. The device 50*b* is a SONET/SDH ADM. The SONET/SDH add/drop devices 50*a* and 50*b* are designed to add/drop telephony and PDH fixed bandwidth channels such as N×DS0 (64 kbps, carrying a telephony channel) and T1/T3 channels. The device 50*c* is a data-aware SONET/SDH ADM. The data-aware SONET/SDH ADM 50*c* is configured to add/drop IP and ATM packet data to and from the SONET/SDH rings 32*a*–32*n*. The device 50*n* is a digital cross-connect (DCC). The digital cross-connect (DCC) 50*n* connects different SONET/SDH rings or perform add/drop operations on DS3 (45 Mbps) channels.

The conventional network 30 requires multiple data type SONET/SDH rings and add/drop devices. The SONET/SDH network 30 requires many different fiber rings and different types of add/drop devices for creating a medium-to-long haul optical network. The multiple SONET/SDH rings and add/drop devices increase cost. Additionally, complexity and cost of the SONET/SDH ADMs prohibit wide-area deployment for transportation of voice, data, and video traffic for long-haul networks.

SUMMARY OF THE INVENTION

The present invention concerns an apparatus comprising one or more nodes. The apparatus may be configured to transport one or more packets within a frame. The one or more nodes may be configured to add and/or drop at least one of the one or more packet from the frame.

The objects, features and advantages of the present invention include providing a method and/or architecture for hybrid data transport that may (i) allow an add/drop multiplexer (ADM) and/or a router connected to a network to drop any type of protocol packet (such as ATM, IP, PPP, PDH (e.g., T1/T3), or raw byte stream) from a payload area at any optical node, (ii) provide an ADM and/or a router connected to a network that may add any protocol packet (such as ATM, IP, PPP, PDH (e.g., T1/T3), or raw byte stream) to the payload area at any optical node, either (a) as a new addition or (b) in place of a dropped packet, (iii) optimize available bandwidth of a network to deliver a maximum number of services and protocols and/or (iv) provide significant savings in equipment and fiber optics infrastructure.

BRIEF DESCRIPTION OF THE DRAWINGS

These and other objects, features and advantages of the present invention will be apparent from the following detailed description and the appended claims and drawings in which:

FIG. 1 is a detailed timing diagram of conventional frame for fiber optic data transmission;

FIG. 2 is a block diagram of a conventional multi-service optical network;

FIG. 3 is a block diagram of various conventional SONET/SDH add/drop multiplexers;

FIG. 7 is a detailed block diagram of a payload of FIG. 6;

FIG. 8 is a detailed block diagram of a packet of FIG. 7;

FIG. 9 is a detailed block diagram of a packet header of FIG. 8;

DETAILED DESCRIPTION OF THE PREFERRED EMBODIMENTS

Figure 4:
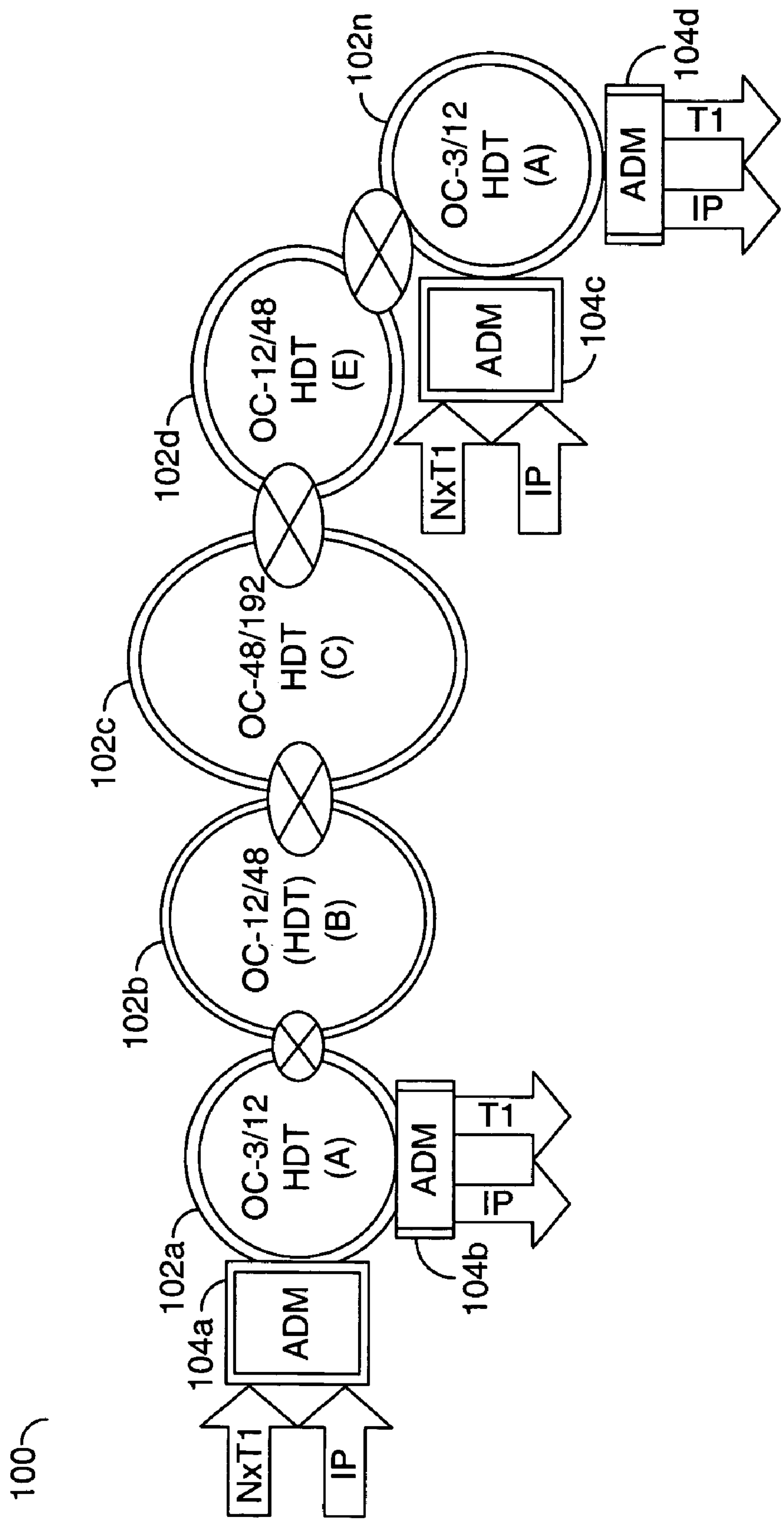
FIG. 4 is a block diagram of a preferred embodiment of the present invention.

Referring to FIG. 4, a block diagram of system 100 is shown in accordance with a preferred embodiment of the present invention. The system 100 may allow a single device to add and/or drop one or more types of data traffic from a single fiber optic line. The system 100 may provide an add/drop multiplexer (ADM) that may allow the use of a single device for a variety of data types. In one example, the system 100 may be implemented as a SONET/SDH network implementing SONET/SDH ADMs. The system 100 may require a single fiber optic line and a single type of SONET/SDH ADM to carry a number of different data traffic types. The system 100 may result in significant savings for network carriers. Additionally, the system 100 may allow for provisioning services over short or long haul optical networks.

The structure of the network 100 may comprise a number of rings 102*a*–102*n* and a number of add/drop multiplexers (ADMs) 104*a*–104*n*. The ADMs 104*a*–104*n* may be implemented to communicate with the rings 102*a*–102*n*. Each of the rings 102*a*–102*n* may be implemented as an optical carrier ring. Each of the ADMs 104*a*–104*n* may be configured to add/drop data (e.g., PDH data or IP data) to/from the network 100. In one example, each of the ADMs 104*a*–104*n* may be implemented as a SONET/SDH ADM. The network 100 may allow existing fiber optic lines to be utilized at full capacity. The system 100 may not require installation of additional fiber links (e.g., ADMs) for different types of data traffic. The system 100 may allow conventional SONET/SDH ADMs to be implemented to add/drop data. The system 100 may not require additional SONET/SDH ADMs. Therefore, the system 100 may allow for significant cost savings in network infrastructure.

In one example, the system 100 may be implemented as a long-haul multi-service network. In another example, the rings 102*a*, 102*b*, 102*c*, 102*d* and 102*n* may be implemented as a customer premise equipment (CPE) ring, a local central office ring, an interexchange ring, a local central office ring and a CPE ring, respectively. However, the rings 102*a*–102*n* may each be implemented as another appropriate network component in order to meet the criteria of a particular implementation. Additionally, each of the rings 102*a*–102*n* may be implemented to provide unified data transport.

The system 100 may provide a simplified multi-service SONET/SDH network. The system 100 may provide unified data transport over a fiber optic line. The unified data transport may allow transportation of one or more different types of data over a single fiber optic line within a single SONET/SDH payload. The unified data transport may be provided by a data transport protocol. The data transport protocol may be implemented, in one example, as a hybrid data transport (HDT). The HDT protocol may provide a common data header for all data types. The HDT protocol may create a frame having space for storing different types of data (to be discussed in connection with FIGS. 6, 7, 8 and 9). Additionally, the frame may be flexible in length in order to accommodate for different types and lengths of packet data.

Figure 5:
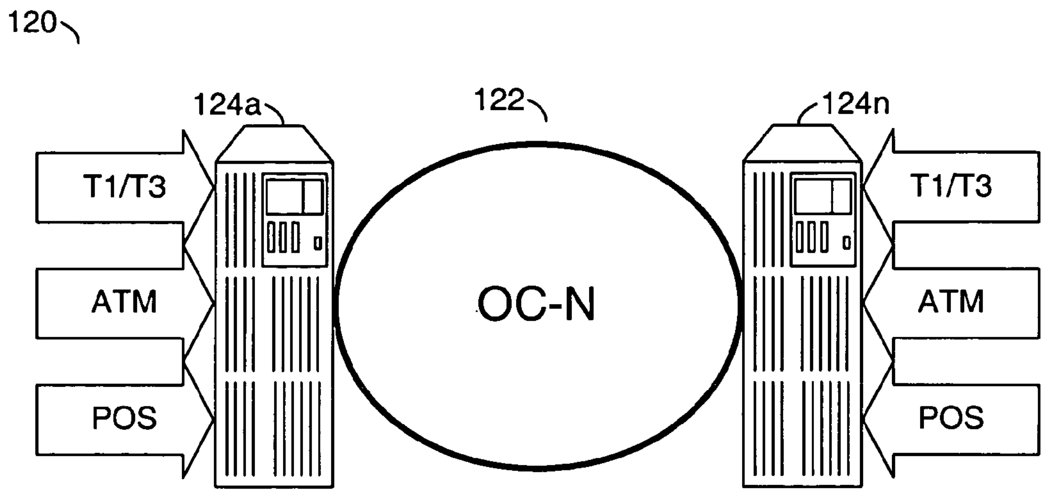
FIG. 5 is a block diagram illustrating an implementation of the present invention.

Referring to FIG. 5, a block diagram of an unified SONET/SDH network 120 is shown. The network 120 may support the hybrid data transport (HDT) protocol. The network 120 may comprise a ring 122 and a number of nodes 124*a*–124*n*. The nodes 124*a*–124*n* may communicate with the ring 122. In one example, the ring may be implemented as a single fiber optical line. Each of the nodes 124*a*–124*n* may receive ATM cells, packet-over-SONET/SDH (POS), and PDH (e.g., T1/T3) types of data via the ring 122. The nodes 124*a*–124*n* may be similar to the nodes 104*a*–104*n*.

Figure 6:
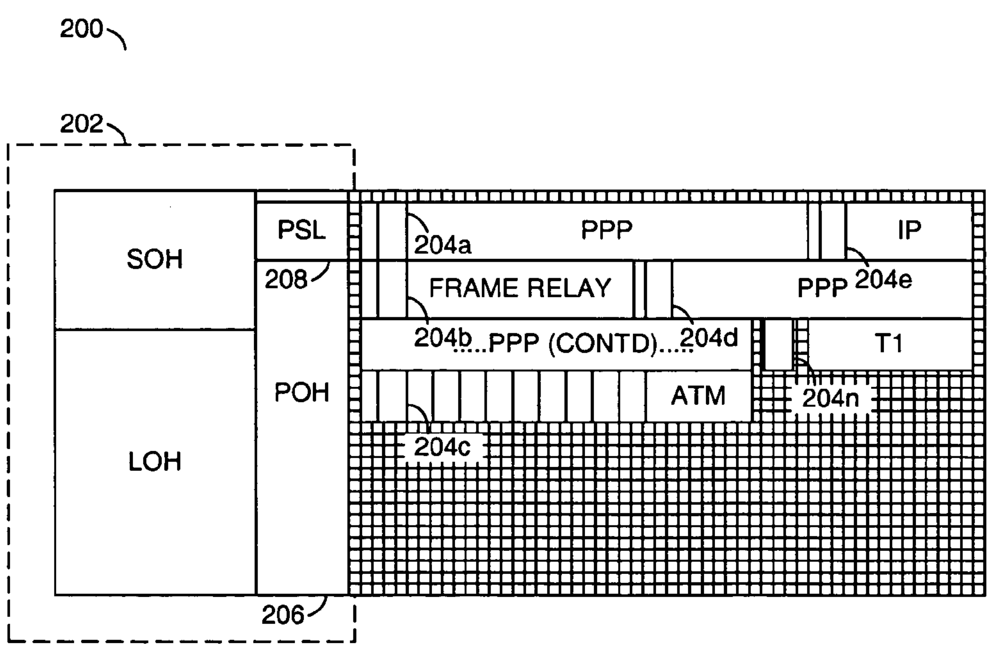
FIG. 6 is a detailed block diagram of a protocol independent frame.

Referring to FIG. 6, a detailed block diagram of a protocol independent frame 200 is shown. In one example, the frame 200 may be implemented as a SONET/SDH frame. The frame 200 may illustrate mapping of different data types in a SONET/SDH SPE envelope. The frame 200 may have an embedded frame header (and/or footer) 202 (e.g., a 32-bit frame header) to create a deterministic packet transport protocol. Additionally, the synchronous payload envelope SPE of frame 200 may comprise a number of 32-bit payload headers 204*a*–204*n* that may precede each packet of the envelope. The payload headers 204*a*–204*n* may proceed the packets regardless of a particular packet data type stored within the SPE. The frame 200 may achieve bandwidth maximization. The frame header 202 may comprise a SONET/SDH path over-head (POH) 206. The SONET/SDH POH may comprise a single path signal label (PSL) value 208. The PSL value 208 may provide specific information regarding the various types of packets embedded within the payload of a particular frame. The PSL 208 may be implemented as a few header bits configured to denote the particular type of packet (e.g., ATM, IP, PPP, Frame Relay, etc.) embedded within the payload portion of the frame 200.

Referring to FIG. 7, a detailed block diagram of the SONET/SDH synchronous payload envelope (SPE) of the frame 200 is shown. The SONET/SDH SPE may comprise a number of packets 220*a*–220*n* and a number of empty packets 222*a*–222*n*. The packet payload header 204*a* of the packet 220*a* may identify the packet/protocol. The packet payload header 204*a* may identify a packet type of the packet 220*a* stored (or transported). The payload header 204*a* may tell what kind of packet/protocol (such as Ethernet, PPP, IP, Frame Relay, ATM cells, T1, etc.) is inside a payload of the packet 220*a*. Different protocols may be supported at two ends (e.g., the devices 104*a*–104*n*) of a network without the need for provisioning in advance. In contrast, conventional approaches use a protocol over WAN, which is usually negotiated between two parties at the end devices 104*a*–104*n* of the WAN link.

The payload header 204*a* may be used to tell whether one or more of the empty packets 222*a*–222*n* inside the SONET/SDH SPE that may be reused at an intermediate node. In contrast, in conventional SONET/SDH networks the entire SONET/SDH frame 200 travels around the ring until removed by the sender. With the system 100, a receiver may mark a portion of the SONET/SDH SPE of the frame 200 as reusable. A particular node on the fiber network 100 may mark different sections of the SONET/SDH SPE as reusable by the same or remaining nodes 104*a*–104*n.*

Provisioning of TDM channels may provide the ability to mark a portion (or many portions) of a SONET/SDH SPE payload area as reusable/non-reusable. With a non-reusable area, even when a receiver receives the packet, another receiver cannot reuse the packet area. However, the same receiver may reuse the reusable area.

In general, there is no limit to the order and manner of packet positioning. Any packet may be marked in any fashion to support, for example, a dynamic mix of data and voice (TDM) traffic on a SONET/SDH network. Such an implementation is not possible with current technologies. The present invention may solve the problem of mixed value and data transmissions faced by telephone carriers and data providers.

As SONET/SDH frames containing fixed bandwidth channels move around the ring, (i) intermediate nodes may detect reusable packets (e.g., the reusability bit is reset), (ii) note offsets of the reusable packets, and (iii) preserve the respective offsets when recreating the frame (e.g., after adding packets from local input ports) for outbound traffic.

Referring to FIG. 8, a detailed example of a packet is shown. An SDL framing 262 may be in the first 16 bits and may contain the length of the entire payload, including SDL framing bytes. A 16-bits of CRC-16 264 may be provided on the length field (e.g., x16+x12+x5+1). The payload header 204*a*–204*n* may be a 32-bit word, followed optionally by an OAM bytes or MPLS labels 268. MPLS/OAM bytes may be variable number of MPLS labels or OAM values that may be transmitted in the header area of HDT, outside of payload. A next fragment offset 270 may be a 16-bit value showing the location offset of next packet fragment (if any) of the packet. The next fragment offset 270 is generally taken from the start of current packet. A header CRC 272 may be computed over payload header bytes only, with same scrambling polynomial used for SDL framing. A payload area 274 may contain the actual packet to be transmitted over the WDM or SONET/SDH link. The payload area 274 may contain one of a number of types of protocol packets, such as Ethernet, ATM, GR.702, PPP, Frame Relay, etc. A payload CRC 276 may be user-controlled value and may be computed for the payload bytes only. The payload CRC 276 is generally either a 16 or 32-bit value, depending on mutual negotiation between sending and receiving stations.

Referring to FIG. 9, various parameters of the packet header 204*a* are shown. The particular bit width of the payload header 204*a* may be varied accordingly to meet the design criteria of a particular implementation. A packet identifier 280 (e.g., D3: D0) generally identifies the type of packet in the payload. For example, value of 0000 may represent a null packet. A null packet may indicate that the payload area may be reused. When a packet is dropped at a node, the length field does not generally need to be modified for the packet, only the D3: D0 bits need to be cleared.

A header data area 282 may carry MPLS labels (e.g., outside of payload area). Operation administration and maintenance (OAM) bytes 282 may be used for link management, or any other data separately from the payload. A reusability area 284 (e.g., D7) may be a "1". If a SONET/SDH node can reuse a particular packet area, the packet length field 264 of the SDL header may give the size of the packet area. If the bit D7 may be set to a "0", then a node will not generally mark the packet area as re-usable, even after a packet has been dropped. The particular nodes of the various configuration bits may be varied (e.g., inverted) accordingly to meet the design criteria of a particular implementation.

A header length area 286 (e.g., D15: D8) may include, in one example, a 32-bit payload header. A fragment identifier area 288 (e.g., D17: D16) may be implemented as a two word value. Allowing packets to be at a fix location within the payload area and dropping/adding packets at intermediate nodes may require some packets to be fragmented to fill empty spaces left by previously dropped packets. When a packet is fragmented, sections (e.g., fragments) of the packet may be stored in available spaces. The fragments are linked by specifying a next-fragment location (offset) in the preceding fragment. A value of "00" in the first packet (fragment) may indicate that the payload area contains a complete packet. A value of "01" may indicate the beginning packet of a fragmentation sequence. A value of "10" may indicate a continuation of packets. A value of "11" may mark the last fragment in the series. Other particular bit patterns may be implemented accordingly to meet the design criteria of a particular implementation.

A padding area 290 (e.g., D18: D19) may indicate a minimum packet length. In one example, the minimum packet length may be 4 bytes (e.g., 2 bytes length+2 bytes CRC). Idle bytes at the end of packets and elsewhere may be marked by a length field of "0000". In instances there may be less than 4 bytes left between packets. However, another appropriate number and/or configuration of bytes may be implemented in order to meet the criteria of a particular implementation. Additionally, the header structure may mandate the appropriate number of bytes. In this case, it may be impossible to place a SDL null packet. Such idle bytes are shown as tail-end padding for the preceding packet. An unused area 292 (e.g., D31:20) may be used for additional expansion.

Devices supporting the hybrid data transport (HDT) protocol may operate similarly to normal SONET/SDH transport. Additionally, processing operations for ATM cells, POS, and PDH data may be similar. For example, the nodes 104*a*–104*n* may operate similar to normal SONET/SDH nodes. Additionally, the HDT protocol may add a header to each frame 200 and add a payload header to each packet within a payload area of the SONET/SDH frame 200. The payload headers may allow the packets to mix within the payload area of the frame 200. Operation of the HDT protocol is generally related to processing of the headers. The processing of the headers may identify a type of data packet within the SONET/SDH payload. The packet may be one of a plurality of packet types.

Recall that support of PDH-type (T1/T3) channel may require a fixed starting location for the channel in every frame. If PDH support is not required (e.g., no fixed bandwidth channels), packets of any data type may be placed anywhere within the envelope. The placement of the packets of various data types within the SPE may allow the system 100 to achieve excellent bandwidth utilization. Additionally, the system 100 may have a reduced operational complexity. If PDH support is required (e.g., fixed bandwidth channels), the fixed bandwidth channels may be required to be static in their locations for each consecutive SONET/SDH frame. In this case, any additionally added data packets (e.g., ATM or IP) may need to be fragmented to fit the empty spaces left by dropped packets.

However, fragmentation of a packet may be easily accomplished with the system 100. The network 100 sequentially transmit bytes in the payload area of the frame 200. Since packet bytes are always sent in sequence on a particular optical link, a plain offset for the next fragment starting location may link packet fragments. The system 100 may efficiently recover the sequenced fragments.

Figure 10:
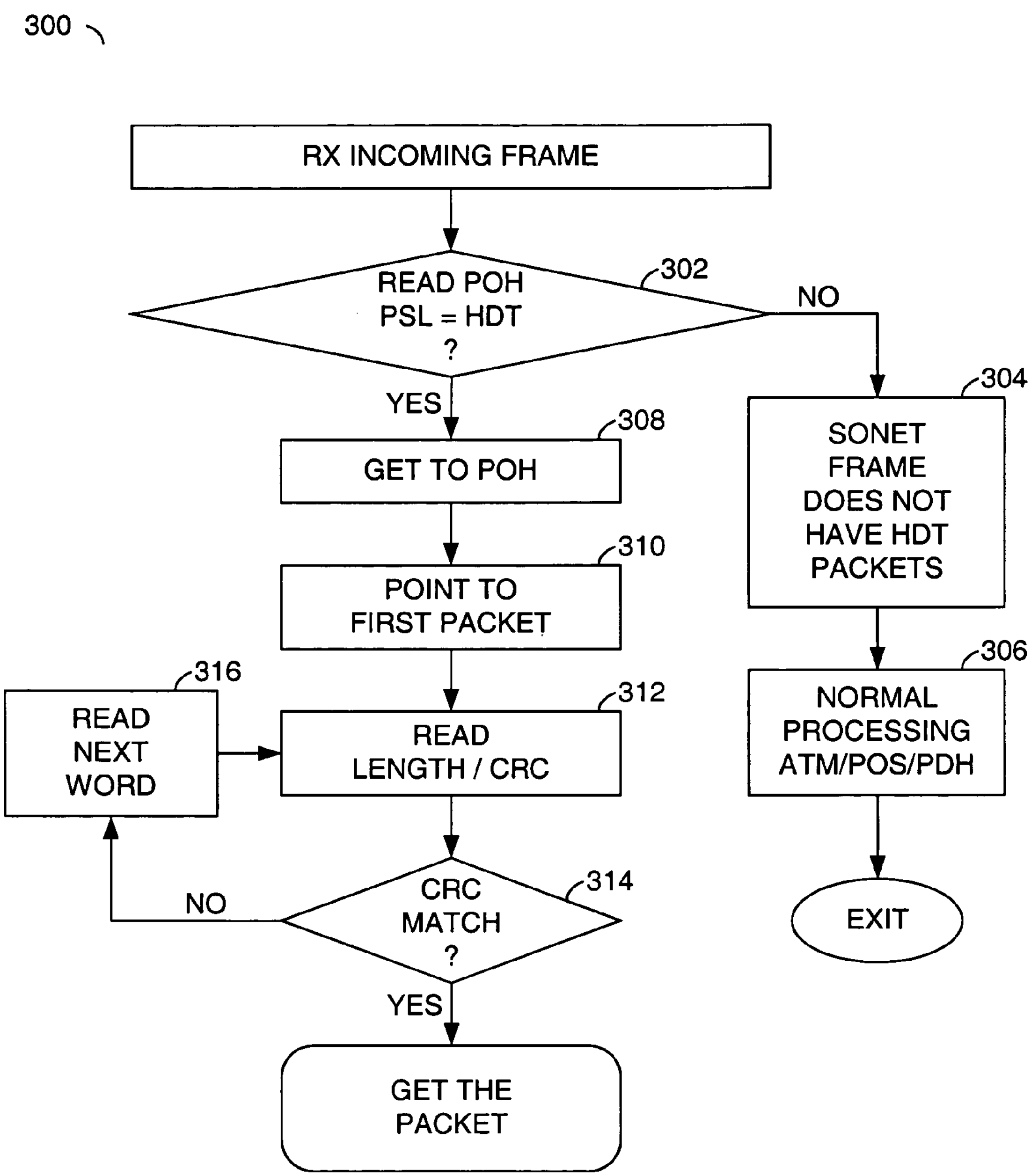
FIG. 10 is a flow chart illustrating an operation of the present invention.

Referring to FIG. 10, an example of a receive operation 300 is shown. A node may receive a frame (e.g., the nodes 104*a*–104*n*). A block 302 may determine if the received frame is an HDT frame. The block 302 may use a PSL value in the POH to determine the type of protocol carried inside the SPE. If the PSL shows POS, ATM, or PDH traffic, the receive operation may proceed to the block 304. If no HDT packets are present, a block 306 may process the POS/ATM/PDH packet. If in the block 302, the PSL shows the SPE contains HDT frames, the node may implement additional logic for HDT processing. The HDT logic may detect and route different types of packets embedded in the SONET/SDH SPE.

A block 308 may read the POH. A block 310 may determine a first packet of the SONET/SDH SPE. A block 312 may read a length and CRC of the first packet. A block 314 may determine a match of the length and the CRC. If a non-match of the length and CRC occurs, the receive operation is generally continues to a block 316. The block 316 may read a next word of the packet. If a match occurs, the receive operation may process the packet. Once the payload header has been processed and different packet types are identified, hardware (e.g., implemented in the system 100) may use header fields to retrieve the payload and implement hardware blocks for processing.

In traditional ATM transport over SONET/SDH, looking at the PSL value generally retrieves ATM cells. The PSL may determine if ATM cells are present and may then reach the SONET/SDH SPE to retrieve the fixed byte ATM cells, either with or without HEC-based cell delineation.

In HDT transport protocol, if the payload header in the HDT shows that the payload contains ATM cells, the hardware device may retrieve the appropriate payload bytes (up to number of bytes specified in length field) and sends the byte stream to an existing ATM cell processing block. The ATM cell processing block may then work on the byte stream using HEC hunting just as if the SPE contained only ATM cells in the payload area.

The ADMs may be implemented to provide the receive operation 300. The receive operation 300 may illustrate a drop operation of the SONET/SDH ADMs 104*a*–104*n*. Each node on a network may receive a SONET/SDH frame. The nodes may use the PSL value in the POH to determine a type of protocol carried inside the SONET/SDH SPE. If the PSL shows POS, or ATM, or PDH traffic, the nodes may receive the packet normally. If the PSL shows the SONET/SDH frame contains SONET/SDH HDT frames, the nodes may implement additional logic for HDT processing. The additional HDT processing may detect and route different types of packets embedded in the SONET/SDH SPE. Generally, once the payload header has been processed and different packet types are identified, the hardware may use header fields to retrieve the payload and implement normal processing techniques.

Figure 11:
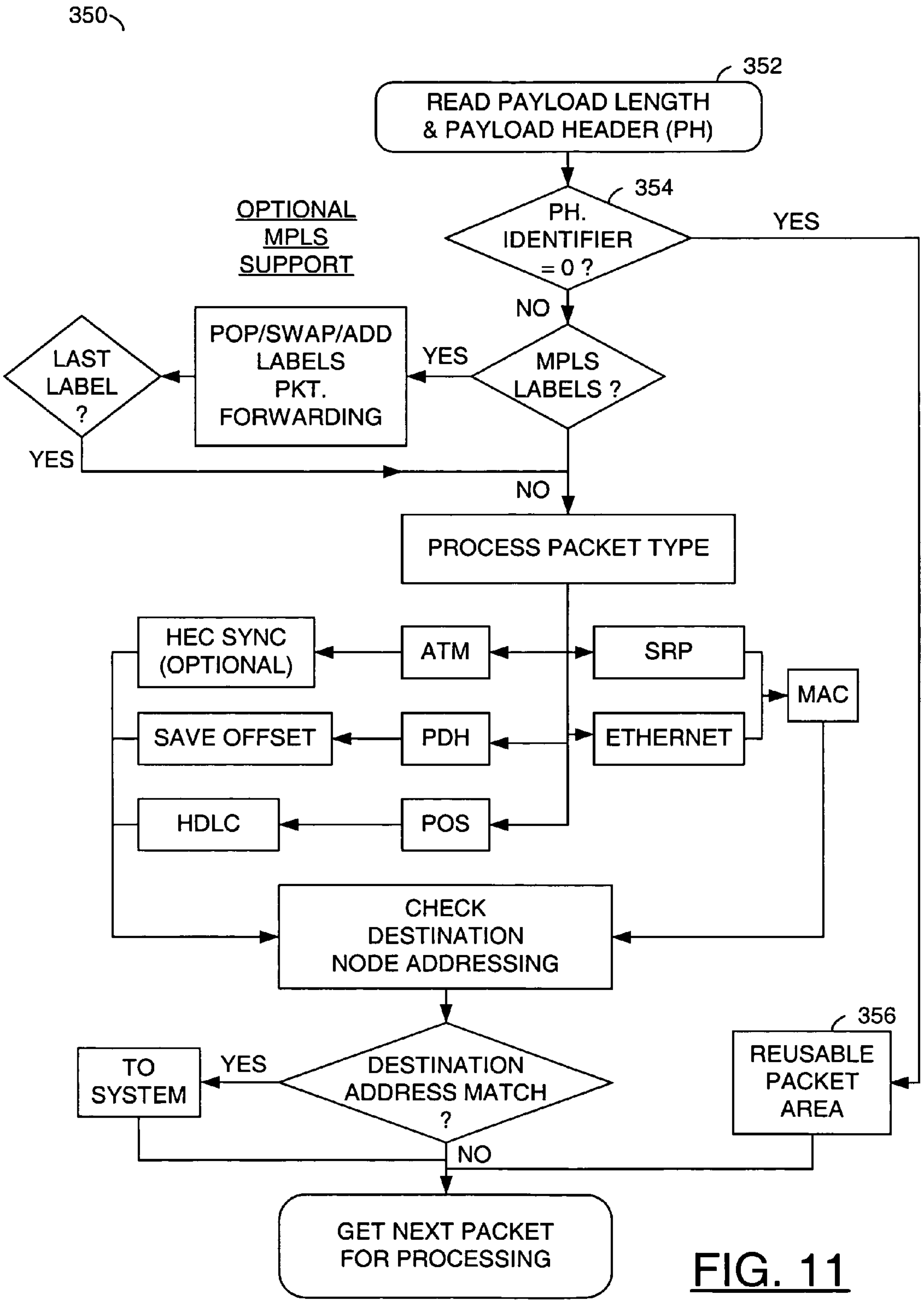
FIG. 11 is a flow chart illustrating an operation of the present invention.

Referring to FIG. 11, an example of a processing operation 350 is shown. The processing operation 350 may illustrate packet processing using the HDT protocol. The processing operation 350 may include dropping a packet of data from an envelope and returning the frame back to the network 100. Additionally, the processing operation 350 may reroute remaining data of the SONET/SDH frame for onward transmission to downstream nodes.

A device supporting the hybrid data transport (HDT) protocol generally operates much the same as a normal SONET/SDH device would operate. Operations for processing ATM cells, POS, and PDH protocols may be similar. The HDT protocol generally adds a header to each frame and a payload header to each packet to allow mixing within the same SPE. Much of the HDT processing is generally related to processing of the headers in order to identify the type of packet. Once a type of packet is identified, starting address of data bytes may be passed to standard logic blocks (e.g., ATM, PDH, POS, SRP and Ethernet processing blocks) for processing an individual packet type.

As the frame is received initial bytes may be placed in a small transit buffer. If the packet does not belong to the receiving node, the bytes are generally streamed out of transit buffer to an output port. However, if the packet belongs to the node processing may continue.

A block 352 may read a payload length and payload header of an incoming packet. If a bandwidth allocate bit (e.g., BA—bit D7) is asserted "1" in the payload header (PH), the packet area may be reserved for fixed bandwidth channels such as PDH. To provide fixed bandwidth the node may place an outgoing packet at a same offset of the payload SPE when transmitting.

A block 354 may determine a reusability of the packet. If the bandwidth bit D7 is "0", the node may clear the packet identifier bits D3: DO to mark the packet as void or reusable. A reusable packet may proceed to the block 356. If the packet area is reserved, the packet identifier bits (e.g., D3: DO) may not be cleared. If the bytes of the packet belong to the receiving node, the packet may be sent to the system via the processing operation 350. A particular number of bytes to be sent to the system is generally specified in the length field of the SDL header. If the header shows fragmentation, then the packet is generally received and assembled before being sent to system.

Figure 12:
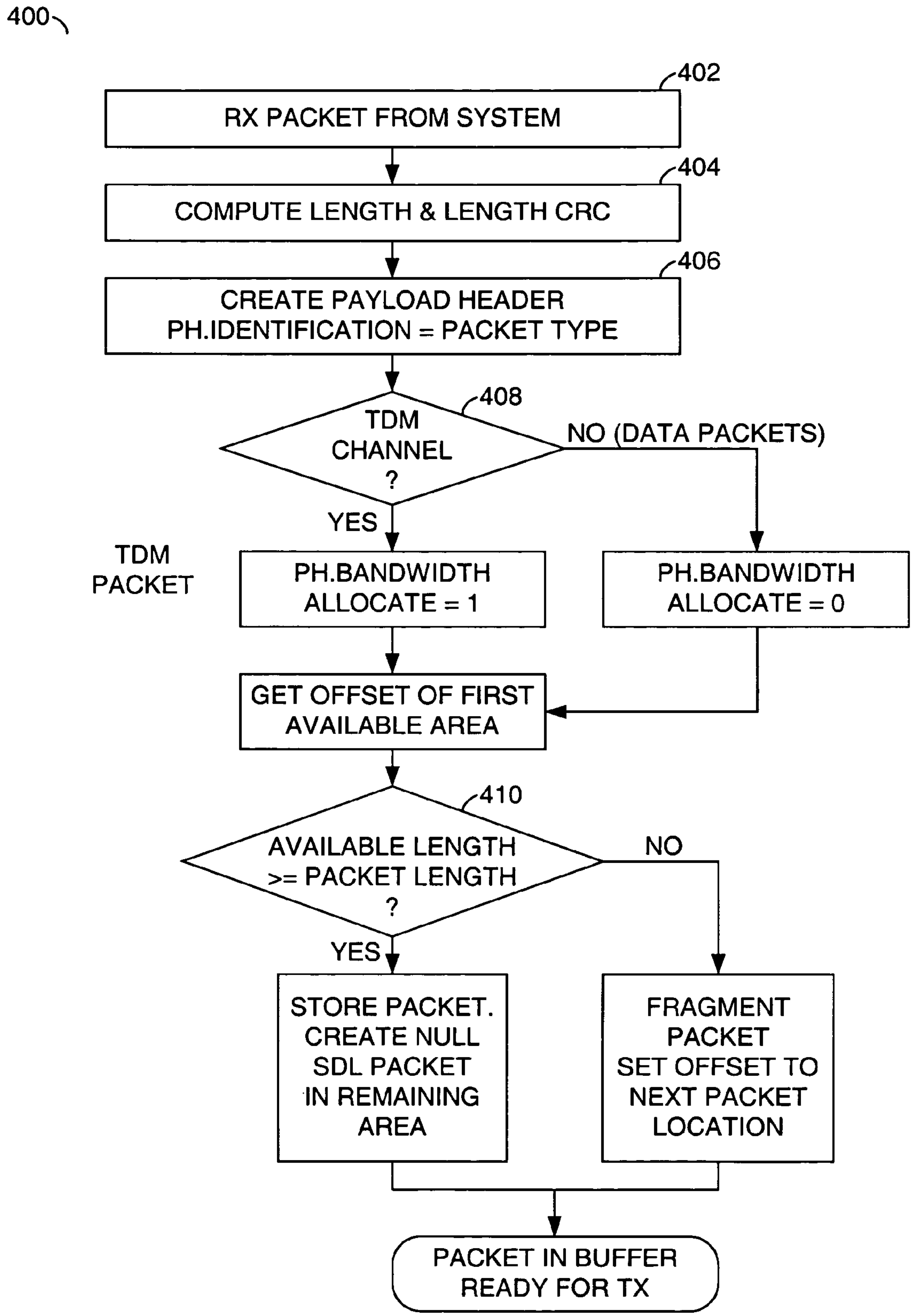
FIG. 12 is a flow chart illustrating an operation of the present invention.

Referring to FIG. 12, an example of a transmit operation 400 is shown. Transmission involves addition of new data from system or retransmission of circulating data from upstream nodes to downstream nodes. A device supporting HDT may receive a packet to be transmitted from a system side. In the transmit operation 400, a node may take inputs from different sources 402, encapsulate the packets with an SDL length/CRC fields 404, add an HDT header 406 to each of the packets, and then store the packets inside the SPE.

The node may not send a fresh frame on the network in order to transmit the packets. A TDM channel check 408 may determine a reusability of the SPE. The transmit operation 400 may reuse available space in an incoming SONET/SDH frame (containing HDT frames). The transmit operation 400 may then may proceed to a length check 410 to see if there is any space available in the SPE to insert the packet to be sent. If there is enough space, the entire packet is stored (with proper SDL framing and HDT header bytes). Any remaining bytes, depending on the size, are generally either (i) filled with a null HDT packet (e.g., the payload header identification bits are 0000), (ii) filled with SDL null packets (e.g., pairs of length/CRC with a null length field), or (iii) accounted for as tail-end padding (e.g., if the size is less than 4 bytes).

If the transmit operation 400 runs into a fixed-bandwidth channel allocation midway through the packet allocation, the packet is generally fragmented. In this case, a portion of the packet may be stored at one place and other fragments may be stored at another free location. The first fragment offset pointer may contain the starting location of second fragment. Since bytes are transmitted sequentially in the frame 200, reassembling fragments may be easily achieved.

If a particular node detects an incoming SONET/SDH frame on a receive port, or if there is a frame in the transmit/receive queue, the node may check the SONET/SDH frame 200 to see if there are unused/reusable areas in the incoming/queued frame that can be used for sending data. If there is enough space available in the frame, the node may fill the space with additional data before sending the frame.

In HDT, PDH channels of any bandwidth (up to allowable SONET bandwidth limits) may be provisioned anywhere inside the SONET/SDH SPE. To achieve precise timing, PDH bytes must begin at the same offset inside the SONET/SDH SPE. However, allocation of PDH channels at different locations inside a SONET/SDH SPE may create fragments of unused bytes all over the SONET/SDH SPE. For efficient transport of variable-size IP packets, these unused bytes may be utilized for IP data.

The transmit (e.g., add) operation 400 may receive inputs from different sources. The operation 400 may (i) add an HDT header to each outgoing packets, (ii) encapsulate the packets with SDL length/CRC fields and (iii) place the packets within a SPE of a SONET/SDH frame. The SONET/SDH node may not be required to send a fresh frame on the network. The SONET/SDH node may be configured to reuse available space in an incoming HDT protocol frame.

For example, a device (e.g., ADM or router) supporting HDT may receive a packet from a system side that may transmit. The device may then look in an output packet buffer to determine if there is any space available where the packet may be inserted. If there is enough space, the entire packet may be stored (with proper SDL framing and HDT header bytes). Any remaining bytes, depending on the size may be either filled with a null HDT packet (the payload header identification bits are 0000), filled with SDL null packets (pairs of length/CRC with a null length field) or (if the size is less than 4 bytes) accounted for as tail-end padding.

If the device encounters a fixed-bandwidth channel allocation midway through packet allocation, the device may fragment the packet. A portion of the packet may be stored at one location, while other fragments may be stored at another free location. The first fragment may have an offset pointer that may contain a starting location of the second fragment. Since, data bytes may be transmitted sequentially in a SPE, reassembling the fragments may not be difficult.

The packets may be added either using a fresh SONET/SDH SPE or by reusing bytes inside an incoming or a previously created/queued frame. The decision of which packet to add to a void or reusable packet area inside an SPE may be determined by one or more of the following rules:

(i) pick a type of packet that may be specified by the user for an add operation at the node;

(ii) pick a packet (or a collection of packets) that may fit inside the reusable area;

(iii) of all packets that may fit inside the reusable space, pick one based on QoS parameters or packet priority. Since SONET/SDH frames repeat at 125 $\mu$S an interval, frequency of packet transmission within the SPE may be adjusted to achieve desired transfer rates easily;

(iv) for the packet, if bandwidth is generally to be reserved, program the bandwidth allocation bit (bit D7) so all downstream nodes may set a fixed bandwidth for the packet;

(v) set the payload identifier bits (D3: DO) to indicate a type of packet. If any MPLS labels may be added, add them before the packet and mark the length value in the payload header;

(vi) create a SDL length/CRC construct, prepare a complete packet and add the packet to the payload area; and (vii) if the node detects an incoming SONET/SDH frame on the receive port, or if there is a frame in the transmit/receive queue, the node may check the frame to see if there are unused/reusable areas in the incoming/queued frame that may be used for sending data. If there is enough space available in the frame, the node may fill the space with data.

The system 100 may allow a SONET/SDH add/drop multiplexer (ADM) or a router connected to SONET/SDH ring to drop any type of protocol packet (such as ATM, IP, PPP, PDH such as T1/T3, or a raw byte stream) at any optical node. The system 100 may allow a SONET/SDH ADM or a router connected to SONET/SDH ring to add any protocol packet (such as ATM, IP, PPP, PDH such as T1/T3, or a raw byte stream) to a SONET/SDH payload area at any optical node. The packet may be added either as (i) a new addition or (ii) in place of a dropped packet.

The system 100 may allow a user to optimize available bandwidth of the SONET/SDH network to deliver maximum number of services and protocols using same single fiber. The system 100 may provide significant savings in equipment and fiber optics infrastructure.

While the invention has been particularly shown and described with reference to the preferred embodiments thereof, it will be understood by those skilled in the art that various changes in form and details may be made without departing from the spirit and scope of the invention.

What is claimed is:

1. An apparatus comprising:

an interface connectable to a network; and a node configured (i) as an add/drop device for said network, (ii) to transport a plurality of packets having a plurality of protocols within a frame on said network through said interface, (iii) to drop at least one of said packets from said frame and (iv) to add a header to each of said packets, wherein said frame comprises (a) a packet envelope to hold said packets and (b) a label having information specifying that at least two of said protocols are used in said packet envelope wherein said node is further configured to (a) frame each of said packets received through said interfaces using a modified Simple Data Link protocol framing and (b) determine a reusability of each of said packets in response to a reuse bit in said modified Simple Data Link protocol framing.

2. The apparatus according to claim 1, wherein said node comprises a SONET/SDH add/drop multiplexer.

3. The apparatus according to claim 1, wherein said frame is father configured to optimize a bandwidth of said apparatus.

4. The apparatus according to claim 1, wherein said network comprises a fiber optic network.

5. The apparatus according to claim 1, wherein said network comprises one of a Synchronous Optical Network frame and a Synchronous Digital Hierarchy fiber optic network.

6. The apparatus according to claim 1, wherein said packets are selected from the group consisting of (i) Internet Protocol packets, (ii) Packet-Over-SONET/SDH packets, (iii) Point-to-Point Protocol packets, (iv) Asynchronous Transfer Mode cells, (v) G.702-based Plesiochronous Digital Hierarchy packets, and (vi) Frame Relay packets.

7. The apparatus according to claim 1, wherein said network is selected from a group consisting of a point-to-point network and a Wavelength Division Multiplexing network.

8. The apparatus according to claim 1, wherein said node is further configured to determine a reusability of each of said packets within said frame received at said interface.

9. The apparatus according to claim 8, wherein said node is further configured to determine said reusability of each of said packets in response to a reuse bit.

10. The apparatus according to claim 9, wherein each of said headers is configured to store said reuse bit.

11. The apparatus according to claim 1, wherein said node is selected from the group consisting of (i) terminal multiplexers and (ii) SONET/SDH add/drop multiplexes, (iii) data-aware SONET/SDH add/drop multiplexers and (iv) digital cross-connects.

12. A method for transporting a plurality of packets having a plurality of protocols within a frame, comprising the steps of:

(A) adding at least one new packet having one of said protocols to said packets in said frame;

(B) dropping at least one of said packets in said frame; and (C) identifying a data type of a payload in each of said packets from a header added to each of said packets wherein (a) each of a plurality of nodes is configured to generate said frame on a network comprising said packets having a plurality of different protocols received through a plurality of interfaces, and (b) each of said nodes is further configured to (i) frame each of said packets received through said interfaces using a modified Simple Data Link protocol framing and (ii) determine a reusability of each of said packets in response to a reuse bit in said modified Simple Data Link protocol framing.

13. The method according to claim 12, wherein said new packet is selected from the group consisting of (i) Internet Protocol packets, (ii) Packet-Over-SONET/SDH packets, (iii) Point-to-Point Protocol packets, (iv) Asynchronous Transfer Mode cells, (v) G.702-based Plesiochronous Digital Hierarchy packets and (vi) Frame Relay packets.

14. The method according to claim 12, further comprising the step of:

determining a reusability of each of said packets.

15. The method according to claim 14, wherein said determining is further in response to a reuse bit in said header added to each of said packets.

16. An apparatus comprising:

a plurality of nodes configured to interface to a network, wherein (i) each of said nodes is configured to generate a frame on said network comprising a plurality of packets having a plurality of different protocols received through a plurality of interfaces, (ii) each of said nodes is further configured to frame each of said packets received through said interfaces using a modified Simple Data Link protocol framing and (iii) said nodes are further configured to determine a reusability of each of said rackets in response to a reuse bit in said modified Simple Data Link protocol framing.

17. The apparatus according to claim 16, wherein said nodes are further configured as add/drop multiplexers for said network.

18. The apparatus according to claim 16, wherein said network comprises one of a Synchronous Optical Network frame and a Synchronous Digital Hierarchy fiber optic network.

* * * * *